(12) United States Patent
Espinosa Andrews et al.

(10) Patent No.: US 10,709,160 B2
(45) Date of Patent: Jul. 14, 2020

(54) SOLUBLE CALCIUM STABILISED IN AN ANIONIC-CATIONIC POLYMER AND FRUCTANS

(71) Applicant: CENTRO DE INVESTIGACION Y ASISTENCIA EN TECNOLOGIA Y DISENO DEL ESTADO DE JALISCO A.C., Guadalajara (MX)

(72) Inventors: Hugo Espinosa Andrews, Zapopan (MX); Eristeo Garcia Marquez, Yautepec (MX)

(73) Assignee: Centro de Investigacion y Asistencia en Tecnologia y Diseno del Estado de Jalisco A.C., Guadalajara (MX)

(*) Notice: Subject to any disclaimer, the term of this patent is extended or adjusted under 35 U.S.C. 154(b) by 183 days.

(21) Appl. No.: 15/572,518

(22) PCT Filed: Oct. 11, 2016

(86) PCT No.: PCT/MX2016/000106
§ 371 (c)(1),
(2) Date: Nov. 8, 2017

(87) PCT Pub. No.: WO2017/065596
PCT Pub. Date: Apr. 20, 2017

(65) Prior Publication Data
US 2018/0116269 A1 May 3, 2018

(30) Foreign Application Priority Data
Oct. 15, 2015 (MX) .................... A/2015/014522

(51) Int. Cl.
| | | |
|---|---|---|
| *A23L 33/165* | (2016.01) | |
| *A23L 33/21* | (2016.01) | |
| *C08L 5/08* | (2006.01) | |
| *C08B 37/08* | (2006.01) | |
| *A23L 29/20* | (2016.01) | |
| *C08L 89/00* | (2006.01) | |
| *C08L 5/04* | (2006.01) | |
| *C08L 5/00* | (2006.01) | |
| *C08L 5/06* | (2006.01) | |
| *A23L 29/275* | (2016.01) | |
| *A23L 29/25* | (2016.01) | |
| *C01F 11/00* | (2006.01) | |
| *C08B 37/00* | (2006.01) | |
| *G01N 21/35* | (2014.01) | |

(52) U.S. Cl.
CPC .......... *A23L 33/165* (2016.08); *A23L 29/20* (2016.08); *A23L 33/21* (2016.08); *C08B 37/003* (2013.01); *C08L 5/00* (2013.01); *C08L 5/04* (2013.01); *C08L 5/06* (2013.01); *C08L 5/08* (2013.01); *C08L 89/005* (2013.01); *A23L 29/25* (2016.08); *A23L 29/275* (2016.08); *C01F 11/00* (2013.01); *C08B 37/0003* (2013.01); *G01N 2021/3595* (2013.01); *G01N 2223/418* (2013.01)

(58) Field of Classification Search
CPC ........ A23L 33/165; A23L 33/21; C08B 7/003
USPC ........................................ 426/658
See application file for complete search history.

(56) References Cited

U.S. PATENT DOCUMENTS

| | | | |
|---|---|---|---|
| 9,023,398 B2 | 5/2015 | Sakuma | |
| 2002/0019334 A1 | 2/2002 | Portman | |
| 2003/0118712 A1 | 6/2003 | Navarro | |
| 2006/0198927 A1* | 9/2006 | Hojo | ................... A23L 2/44 426/74 |
| 2007/0082028 A1 | 4/2007 | Aimutis | |

FOREIGN PATENT DOCUMENTS

| | | |
|---|---|---|
| EP | 1576895 | 9/2005 |
| WO | WO2007069072 | 6/2007 |

OTHER PUBLICATIONS

International written opinion EP-English (Year: 2019).*
Eristeo Garcia-Marquez et al: Effect of layer (Calcium phosphate-chitosan)-by-layer (mesquite gum) matrix on carotenoids-in-water-emulsion properties, Food Hydrocolloids, vol. 43, 17 Jukly 2014 (pp. 451-458 XP055600366.
Estrada-Fernandez A G et al: "Stabilization of oil-in-water-in-oil (O1/W/O2) Pickering double emulsions by soluble anbd insoluble whey protein concentrate-gum-arabic complexes used s inner and outer interfaces", Journal of Food Engenierring, vol. 221, Oct. 12, 2017, pp. 35-44, XP085268768.

* cited by examiner

*Primary Examiner* — Jyoti Chawla
(74) *Attorney, Agent, or Firm* — Defillo & Associates, Inc.; Evelyn A Defillo

(57) ABSTRACT

The present invention provides processes that promote the solvation of calcium ions in macromolecular matrices. Processes in which the relationship, concentration, physico-chemical conditions at each stage and preparation methods allow to obtain a stabilized soluble product, based on calcium salts and polymers. The present invention does not result in the deposition of crystals of the salts used, and exceeds the commercial calcium formulations so they are of great utility for their application in the food, pharmaceutical and/or cosmetic industry.

5 Claims, 4 Drawing Sheets

SOLUBLE CALCIUM STABILISED IN AN ANIONIC-CATIONIC POLYMER AND FRUCTANS

CROSS REFERENCE TO RELATED APPLICATION

This application is a national stage entry of PCT/MX2016/000106 filed Oct. 11, 2016, under the International Convention claiming priority over Mexican Patent Application No. MX/a/2015/014522 filed Oct. 15, 2015.

TECHNICAL FIELD OF THE INVENTION

The present invention relates to a novel methodology for stabilizing insoluble substances, such as tribasic calcium phosphate and calcium carbonate for their absorption. Particularly the composition of insoluble calcium salts in cationic and anionic polymers that forms soluble complexes, when the coloidal ratios are equimolar.

BACKGROUND OF THE INVENTION

In recent years, there has been a frantic search for research, development, and application of innovative technologies in the use of mixtures of macromolecules with functional properties, capable of stabilizing and delivering bioactive principles. Mainly, because the physicochemical properties of the mono molecular systems are not sufficient to be used as carriers in the delivery of drugs, lipids, bioactive molecules, and minerals. Of all of the administration routes, the oral route has been the most used (90% of the administration), because it provides low cost formulation systems, does not cause pain to the consumer, and allows to supply the active principle to the consumer regardless of age. However, these systems present important challenges to overcome during their journey in the digestive tract related to the digestion and absorption of the bioactive principles, which have as main obstacles the physical, enzymatic, or immunological barriers.

In the particular case of macro minerals such as calcium, the main problem of absorption is physical. One of the main sources of calcium is tribasic calcium phosphate.

The FDA (Food and Drug Administration) authorizes tricalcium phosphate as an additive and appears on the positive list of additives as E-341 (iii). In the year 2013, Annex III of the European Commission Rules No. 1333/2008 of the European Parliament and of the Council was amended by introducing tricalcium phosphate (E 341 (iii)) as an additive in foodstuffs and anti-binder in nutritive foods for newborns, kids, and young people. This is found naturally in cow's milk. Despite the low rate of dissolution and solubility, it is used as a mineral supplement to fortify cereals and pasta. Also as an anti-binder agent, acidity regulator, source of calcium in the prevention and treatment of calcium deficiencies (osteoporosis prevention). It is part of the essential biological reactions of the human system (benefits related to the precipitation of intestinal bile salts, decrease in blood lipid and cholesterol levels). At the present, the delivery of dosages is in the form of suspensions highly insoluble, limiting their bioaccessibility. The solution to the problem of solubility and availability has not been easy; there is no viable alternative to deliver calcium ions efficiently. Despite this, the market estimate of solid oral doses has increased in recent years, mainly in the geriatric population. It is estimated that the market was valued at $570.6 million during 2011, with a forecast of $869.1 million by 2018. Of that projection, 9.6% belongs to the mineral market. This creates an important expectation using the methodology of stabilization of ionized calcium.

It has been achieved ionization and stabilization of a soluble calcium complex using the colloidal technology. With this concept, a wide range of products have been glimpsed that can be improved and taken to the consumer, ensuring rapid absorption of macronutrients and other bioactive compounds of a similar nature. The soluble calcium complex of the present invention has been formulated at the laboratory level using highly soluble natural fibers such as chitosan, mesquite gum, fructans, and inulin. Its stability during storage has been tested under acidic conditions at room temperature. This invention is based on generating and promoting the development of a new methodology for producing the soluble calcium complex.

In patent document WO2007069072A2, it describes a food supplement based on mineral salts obtained with anions of organic or inorganic acids and metal cations such as calcium, magnesium, zinc, iron, copper, manganese, sodium, potassium, nickel, or cobalt. The mineral salts are stabilized with amino acids and/or ammonium salts, stabilized between the cationic bonds and the dative covalent bonds. However, in order for the amino acids and the metal cations, such as calcium, to carry out their respective biological functions, once they are consumed in the food supplement, the dissociation of the compounds is required. Thus, in this system, high energy expenditure is required to dispose of free ions in an aqueous medium; for example the energy required for the release of calcium is greater than 20 KJ/mol.

In patent CN1391444B, the fortification of products such as water, juices, beverages and other liquid food products, added with salts of calcium and magnesium with lactic and citric acid metastable, and optionally stabilized with carbohydrates are described. The disclosed invention has application in the field of beverages as referred to in the document.

U.S. Pat. No. 9,023,398B describes a method for improving the solubility of poorly soluble substances such as tribasic calcium phosphate for application in the pharmaceutical, cosmetic, food and agricultural industries. But methods applied to improve solubility comprise reducing the particle size to 100 μm or less by mechanical methods. The reduction of particle size means increase of surface area and increases of contact with hydrophilic solutions; followed by physical coating using citric acid, citrate, phosphoric, or chondroidine sulfate to enhance solubility. However, the process for delivering calcium as a dietary supplement is not specified.

U.S. Pat. No. 7,994,155 B2 describes an accelerator product for mineral absorption. The accelerator product is based on a non-reducing tetrasaccharide composed of four glucose residues, cyclically bound via α-1,3 and α-1,6, cyclo {>6)-α-D-glucopyranosyl-(1>3)-α-D-glucopyranosyl-(1>6)-α-D-glucopyranosyl-(1>3)-α-Glucopyranosyl (1>}) and/or saccharides derived there from. But is a recommended product to be added in different amounts, among them 0.01 g/kg body weight per day, or preferably 0.5 g/kg body weight per day, or more preferably 1.0 g/kg body weight per day or more on a dry basis and administered in food, beverages, pro-drugs, or medicaments and therefore is a general purpose tetrasaccharide, which can be used in various formulations at the recommended concentrations and are not specific.

Thus, the main technological purpose has been the development of complex intermolecular systems, used as carriers capable of stabilizing and delivering bioactive compounds with multiple applications. Especially because the properties of the mono-molecular components are not sufficient to overcome the effects of the different process conditions or stability.

Fundamentally, because all those products that have the purpose of nourishing do not achieve the solvation process of multiple nutrient molecules. A challenge that must be overcome, since 90% of the routes of administration are oral.

Accordingly, a primary object of the present invention is to stabilize insoluble calcium salts in aqueous solutions and to administer them as a food supplement or in food, pharmaceutical, or cosmetic products.

SUMMARY OF THE INVENTION

According to the invention, there is provided a stabilized soluble calcium complex, including a calcium source present in an amount of 0.05 mg to 15 mg per gram of sample; a cationic polymer present in a mass ratio to the calcium source of between 0.25 and 12.5; an anionic hydrocolloid; and a soluble fiber source. Further is provided in accordance with the invention a method for the preparation of the stabilized soluble calcium complex.

The stabilized soluble calcium complexes referred to in the present disclosure mean the application in the preparation of food supplements in liquid form and/or in solid form to be consumed, either alone or in combination, with solid foods, semi-solids, liquids, gels, or beverages. Also included are the raw materials and intermediate products by any of the processing methods that are used in this procedure. The term soluble calcium referred to in the present invention means a complex composed of tribasic calcium phosphate or calcium chloride, or calcium carbonate, or calcium orthophosphate, or calcium oxide; chitosan or protein of animal or vegetable origin; guar gum; fructans and/or inulin. That it can be used as a liquid or solid product effective to provide calcium and soluble fiber. To be administered alone or in the combinations referred to above. The term "soluble minerals" is referred to, in the present invention, as a required mineral, for example, calcium, phosphorus, iron, magnesium, potassium, copper, selenium, and iodine. Mainly the divalent and monovalent mineral elements necessary to contribute in the formulation of nutritional supplements in their solid and liquid forms. The mineral elements may be contained in the complex of the present finding. In addition to chitosan and/or derivatives thereof, it contains alginate and its salts; sodium, potassium, and propylene glycol alginate, mesquite gum, algarrobo gum, xanthan, which function as carriers for the absorption of minerals in the living organism. The natural minerals contained in the polysaccharides or content of products processed with them. Examples of calcium salts: tribasic calcium phosphate, calcium carbonate, calcium chloride, and calcium oxide.

Calcium utilization is dependent on many factors, including age, population type, sex, and health status. In addition to these factors, from the chemical point of view, the solubility and absorption is dependent on the structure of the sources used, ionization capacity, and concentration of hydrogen ions available in the medium. Both factors modify the efficiency of calcium absorption. One way of enhancing the uptake of minerals, for example calcium, is to provide them in the form of ionized complexes in macromolecular systems as mentioned in this invention.

DETAILED DESCRIPTION OF THE INVENTION

Figure 1:
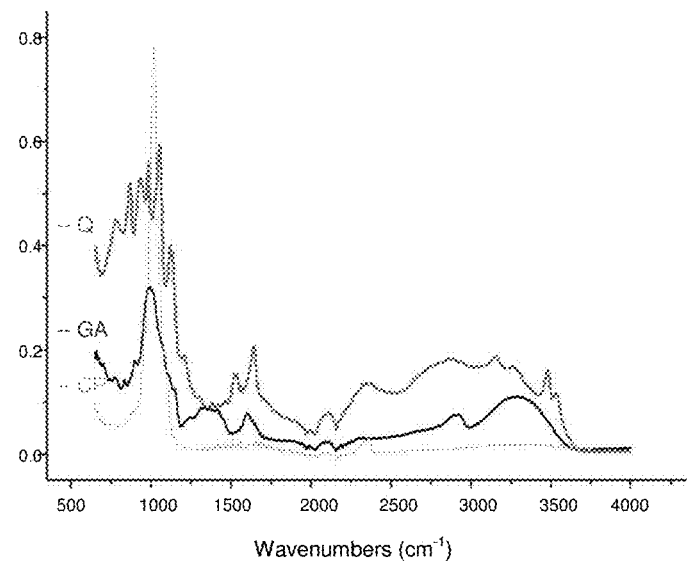
FIG. 1 shows an infrared electromagnetic spectrum of chitosan (-Q), Arabic gum molecular weight (-GA), and tribasic calcium phosphate (-CP). Molecules used in the formation of soluble calcium using chitosan, Arabic gum, fructans and/or inulin.

The following is a more detailed description of some aspects of the invention in order to allow a greater understanding thereof; but without this in any way limiting the same.

The method according to the invention for the preparation of a stabilized soluble calcium complex comprises the following steps:

Preparing a solution of tribasic calcium phosphate between 0.19 g to 5 g, particularly 0.5 to 3 g, but preferably 1 g in 1 ml of phosphoric acid. Adding 8 mL of water to the solution.

Preparing a chitosan solution between 0.01 g and 4 g, preferably 0.4 g of chitosan is dispersed in 20 mL of 1% acetic acid.

The solution obtained in step number one is mixed with the solution of step number two. The temperature is maintained between 1° C. to 70° C., preferably 30° C. Maintain the mass proportions between tribasic calcium phosphate and chitosan between 0.25 and 12.5, preferably 2.5.

Maintaining the solution obtained between 1.0 and 6.5 pH units, preferably at a pH of 3.5. Keeping the solution at rest for 1 to 24 hours, preferably for 12 hours. Controlling the temperature between −5° C. to 40° C., preferably at 4° C.

Dispersing in an anionic food-grade hydrocolloid solution, for example: Arabic gum, guar gum, sodium or potassium alginate, propylene glycol alginate, mesquite gum, xanthan gum, locust bean gum, casein, or pectin. Alginate and Arabic gum from 0.01 g to 50 g. Preferably 20 g of Arabic gum or alginate or the mixture of both polymers in the described relationships or vice versa, with 0.25 g to 12 g of the calcium phosphate-chitosan complex previously described.

Adding 10 g of fructans and/or 10 g of inulin, preferably 5 g of fructans and 5 g of inulin, or more preferably 7.5 g of fructans and 2.5 g of inulin or 2.5 g of fructans and 7.5 g of inulin. The obtained solution is conditioned to be supplied in liquid form. The total solids concentration in the solution is in the range of 30 g to 35 g per 100 mL solution. To reduce the volume, the solution is dried in a spray dryer.

In addition, to provide in more detail other aspects of the invention the following non-limiting examples are provided.

Example 1

Three parts of tribasic calcium phosphate are mixed with 10 parts phosphoric acid. The obtained mixture is mixed with 89 parts of water. The tribasic calcium phosphate is integrated with the aid of a mixer for 5 min. 100 parts of this example may be mixed with 80 parts of the solution prepared in Example 3. Add sufficient amount of a strong base to adjust the pH to 3.5 in the obtained solution. The prepared solution contains 666.7 mg of calcium in solution. The electromagnetic spectra shown in FIG. 1 and FIG. 2 show evidence of calcium stabilization at a ratio of 1.5 with respect to the cationic polymer used.

Figure 2:
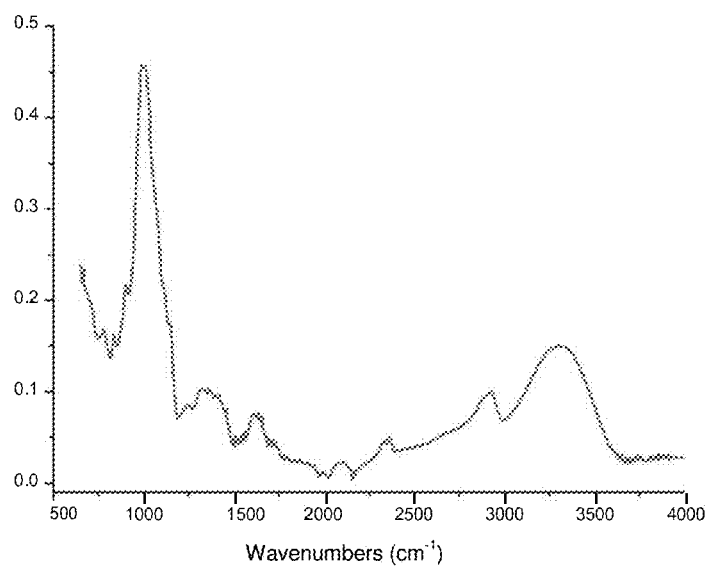
FIG. 2 shows the infrared electromagnetic spectrum of the soluble complex of 1.5 parts of tribasic calcium phosphate; 1 part of chitosan; 20 parts of Arabic gum; and 10 parts of fructans; and/or 5 parts of fructans and 5 parts of inulin, described in example 1.

FIG. 2 contains chitosan, Arabic gum, fructans and inulin.

Example 2

Three parts of calcium carbonate are mixed with 12 parts of phosphoric acid. The obtained mixture is mixed with 87 parts of water. The calcium carbonate is integrated with the aid of a mixer for 5 min. 100 parts of this example may be mixed with 80 parts of the solution prepared in Example 3. Add sufficient amount of a strong base to adjust the pH to 3.5 in the obtained solution. The prepared solution contains 666.7 mg of calcium in solution. The electromagnetic spectra shown in FIG. 1 and FIG. 2 show evidence of calcium stabilization at a ratio of 1.5 with respect to the cationic polymer used. FIG. 2 contains chitosan, Arabic gum, fructans and inulin.

Example 3

3 parts of chitosan are mixed in 98 parts of a solution of 1 part acetic acid and 99 parts of water. The solution of Example 1 is integrated with the aid of a mixer for 5 min. According to Example 1: 16.5 parts of the obtained solution are mixed with 13 parts of the dispersion obtained from this example. Add sufficient amount of a strong base to adjust the pH to 3.5. The solution obtained contains 671 mg of calcium in solution. The electromagnetic spectra shown in FIG. 1 and FIG. 2 show evidence of calcium stabilization at a ratio of 1.5 with respect to the cationic polymer used. FIG. 2 contains chitosan, Arabic gum, fructans and inulin.

Example 4

Figure 3:
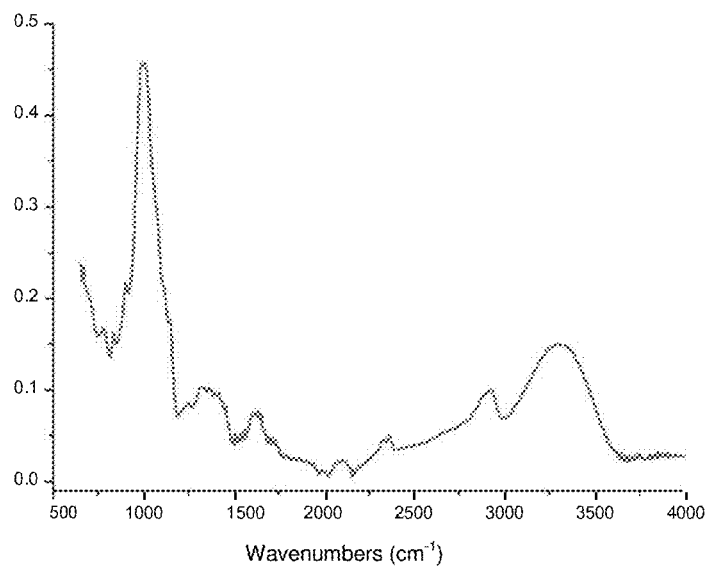
FIG. 3 shows the average infrared electromagnetic spectrum of the soluble complex of 2.5 parts of tribasic calcium phosphate; 1 part of chitosan; 20 parts of Arabic gum; and 10 of fructans; or 5 parts of fructans and 5 parts of inulin, described in example 2.

Based on Example 1. Mix 33 parts with 13 parts of the solution of Example 3. The solution of Example 1 is mixed with the aid of a mixer for 15 min. Add sufficient amount of a strong base to adjust the pH to 3.5. The solution can be integrated by heating to 60° C. Condition the obtained solution below 25° C. The solution obtained contains 860.8 mg of calcium in solution. The electromagnetic spectra shown in FIG. 1 and FIG. 3 show evidence of calcium stabilization at a ratio of 2.5 to the cationic polymer used. FIG. 2 contains chitosan, Arabic gum, fructans and inulin.

Example 5

According to Example 2. Mix 33 parts of the solution obtained with 13 parts of the solution obtained in Example 3. The solution of Example 2 is mixed with the aid of a mixer for 15 min. Add enough of a strong base to adjust the pH to 3.5. The solution can be integrated by heating to 60° C. Condition the obtained solution below 25° C. The solution obtained contains 860.8 mg of calcium in solution. The electromagnetic spectra shown in FIG. 1 and FIG. 3 show evidence of calcium stabilization at a ratio of 2.5 to the cationic polymer used. FIG. 2 contains chitosan, Arabic gum, fructans and inulin.

Example 6

Figure 4:
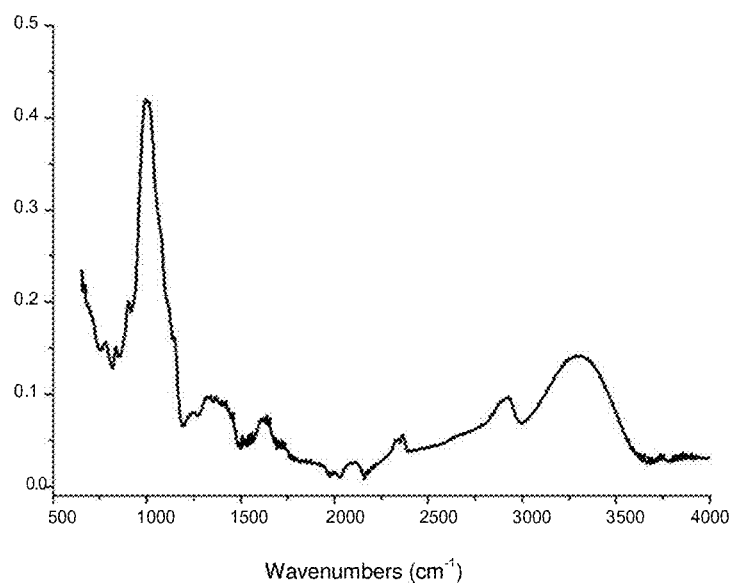
FIG. 4 shows the infrared electromagnetic spectrum of the soluble complex of 5.0 parts of tribasic calcium phosphate; 1 part of chitosan; 20 parts of Arabic gum; 10 parts of fructans; or 5 parts of fructans and 5 parts of inulin, described in example 3.

66 parts of the solution obtained in Example 1 are added in 13 parts of the solution obtained from Example 3. Heat the solution to 50° C. The solution of example one, is integrated with the aid of a mixer for 15 min. Adjust the pH of the dispersion to 3.5 units with a strong base. Condition the obtained solution below 25° C. The solution obtained contains 1000 mg of calcium in solution. The electromagnetic spectra shown in FIG. 1 and FIG. 4 show evidence of calcium stabilization at a ratio of 5.0 to the cationic polymer used. FIG. 2 contains chitosan, Arabic gum, fructans and inulin.

Example 7

66 parts of the solution obtained in Example 2 are mixed with 13 parts of the solution obtained from Example 3. Heat the solution to 50° C. The solution of Example 2 is integrated with the aid of a mixer for 15 min. Add sufficient amount of a strong base to adjust the pH to 3.5. Condition the solution obtained at 20° C. The solution obtained contains 1000 mg of calcium in solution. The electromagnetic spectra shown in FIG. 1 and FIG. 4 show evidence of calcium stabilization at a ratio of 5.0 to the cationic polymer used. FIG. 2 contains chitosan, Arabic gum, fructans and inulin.

Examples 8 to 15, cited below, explain the calcium composition and the different ratios of the matrices used to contain soluble calcium.

Example 8

Mix 5 parts of fructans with 50 parts of water. The solution obtained contains 10% total apparent solids per 100 mL of solution.

Mix 2.5 parts of inulin and 2.5 parts of fructans with 50 parts of water. The solution contains 10% total apparent solids per 100 m of solution.

Mix 1.25 parts of inulin and 3.75 parts of fructans with 50 parts of water. The solution contains 10% total apparent solids per 100 m of solution.

Mix 3.75 parts of inulin and 1.25 parts of fructans with 50 parts of water. The solution contains 10% total apparent solids per 100 m of solution.

Mix 5 parts of inulin with 50 parts of water. The solution obtained contains 10% total apparent solids per 100 mL of solution.

Example 9

20 parts of Arabic gum are dispersed in 85 parts of water. The dispersion is conditioned for use in any of the examples, product of the invention. For example, mix 29.5 parts of the dispersion obtained in Example 1 with 100 parts of this example. Add 50 parts of the solution obtained in Example 8, subsection c). A fluid solution is obtained. The solution may be dried in the usual manner to produce a fine powder. The product contains calcium and soluble fiber. The product can be applied in liquid or solid dosage form.

Example 10

Figure 5:
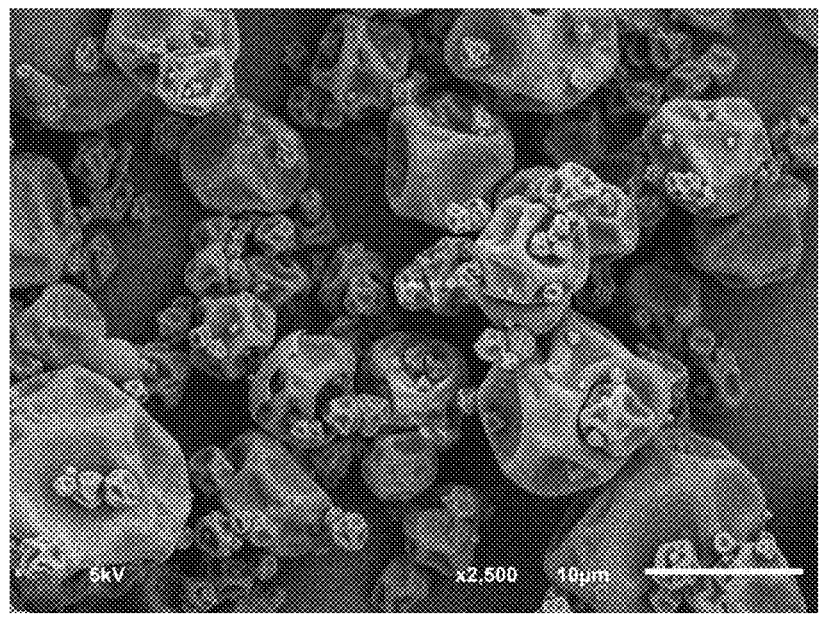
FIG. 5 shows an electron micrograph (2500×) of the soluble complex of 1.5 parts of tribasic calcium phosphate; 1 part of chitosan; 20 parts of Arabic gum; and 10 parts of fructans; 5 parts of fructans and 5 parts of inulin, described in Example 1 or 7.5 parts of fructans and 2.5 parts of inulin, soluble in water.

Based on Example 1. Mix 29.5 parts with 23.6 parts of Example 3. Add 100 parts of solution of Example 9. Finally, add 50 parts of solution of Example 8, part a) or e). The solution contains 3.4% tribasic calcium phosphate, 2.6% cationic polymer. 75.2% anionic polymer and 18.8% fructans or inulin. The percentages are on a dry basis. The evidence of calcium stabilization is observed in FIG. 2, electromagnetic spectrum vs. FIG. 5, electron micrograph (2,500×) where calcium is stabilized in the matrix of chitosan, Arabic gum, fructans or inulin, as noted in example 8, subsection (a) or (e).

Example 11

Based on Example 2. Mix 29.5 parts with 23.6 parts of Example 3. Add 100 parts of solution from Example 9. Finally, add 50 parts of solution from Example 8 (b). The solution contains 3.3% tribasic calcium phosphate, 1.32% calcium ion, 2.7% cationic polymer. 75.2% of anionic polymer and 9.4% of fructans and 9.4% of inulin. The percentages are on a dry basis. The electromagnetic spectra shown in FIG. 2 and the electron micrograph, shown in FIG. 5 (2500×), show evidence of calcium stabilization at a ratio of 1.5 with respect to the cationic polymer used. A fluid solution is obtained. The solution can be dried in the usual manner, for example in a spray dryer, to produce a fine powder. The product contains calcium and soluble fiber. The product can be applied in liquid or solid form.

Example 12

Figure 6:
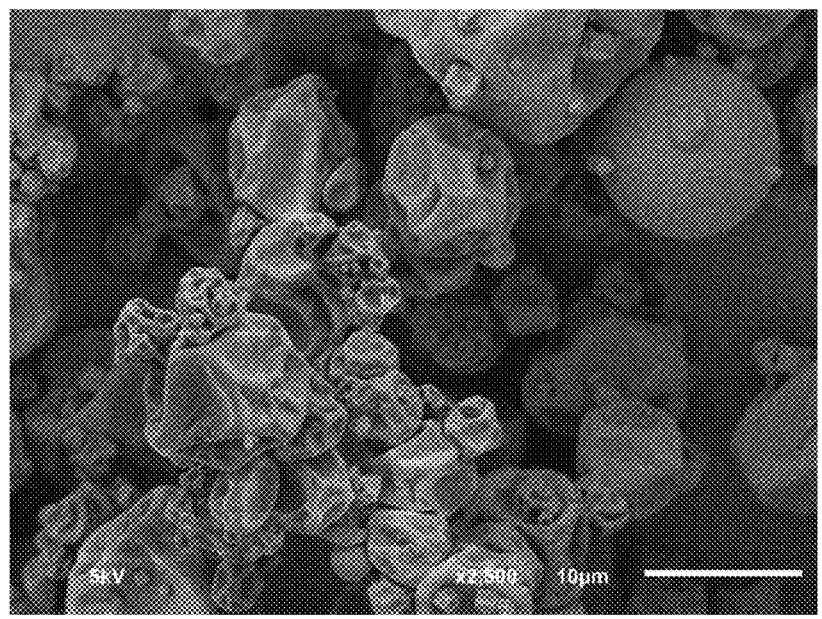
FIG. 6 shows an electron micrograph (2500×) of the soluble complex of 2.5 parts of tribasic calcium phosphate-chitosan; 20 parts of Arabic gum; and 10 parts of fructans; 5 parts of fructans and 5 parts of inulin, described in Example 2, soluble in water.

Based on Example 4, mix 46 parts with 100 parts of Example 9. Add 50 parts of Example 8, subsection d). A fluid solution is obtained. The solution may be dried in the usual manner to produce a fine powder. The product contains calcium and soluble fiber. The product can be applied in liquid or solid form. The composition of the components, product of this invention is 3.75% tribasic calcium phosphate, 1.5% soluble calcium. 1.4% cationic polymer, 75.8% anionic polymer, 14.2% inulin and 4.7% fructans. The electromagnetic spectra shown in FIG. 3 and the electron micrograph, shown in FIG. 6 (2500×), show evidence of soluble calcium at a ratio of 2.5 with respect to the cationic polymer used.

Example 13

Based on Example 5, mix 46 parts with 100 parts of Example 9. Add 50 parts of Example 9, subsection c). A fluid solution is obtained. The solution may be dried in the usual manner to produce a fine powder. The product contains calcium and soluble fiber. The product can be applied in liquid or solid form. The composition of the components, product of this invention is 3.75% tribasic calcium phosphate, 1.5% soluble calcium. 1.4% cationic polymer, 75.8% anionic polymer, 4.7% inulin and 14.2% fructans. The electromagnetic spectra shown in FIG. 3 and the electron micrograph, shown in FIG. 6 (2500×), show evidence of calcium stabilization at a ratio of 2.5 with respect to the cationic polymer used.

Example 14

Figure 7:
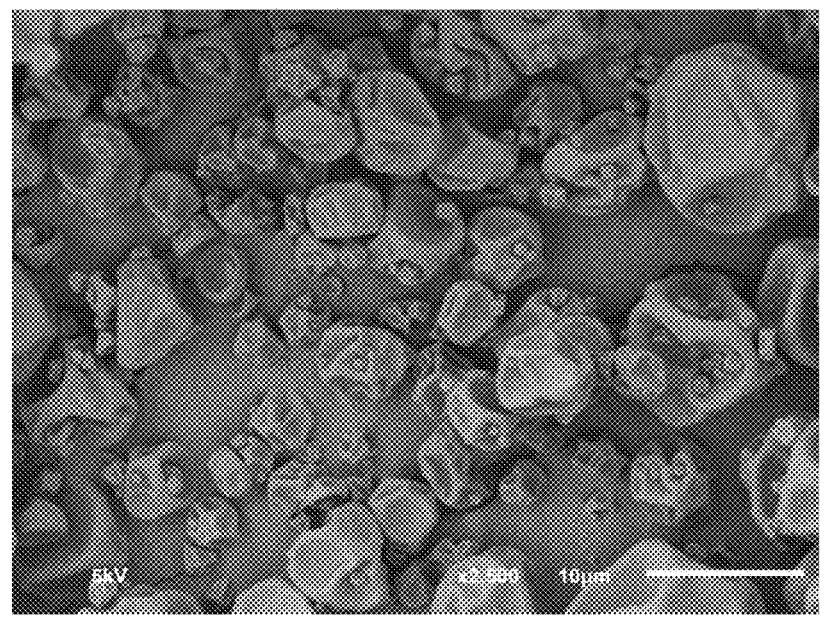
FIG. 7 shows an electron micrograph (2500×) of the soluble complex of 5.0 parts of tribasic calcium phosphate-chitosan; 20 parts of Arabic gum; and 10 parts of fructans; or 5 parts of fructans and 5 parts of inulin, described in Example 2, soluble in water.
Figure 8:
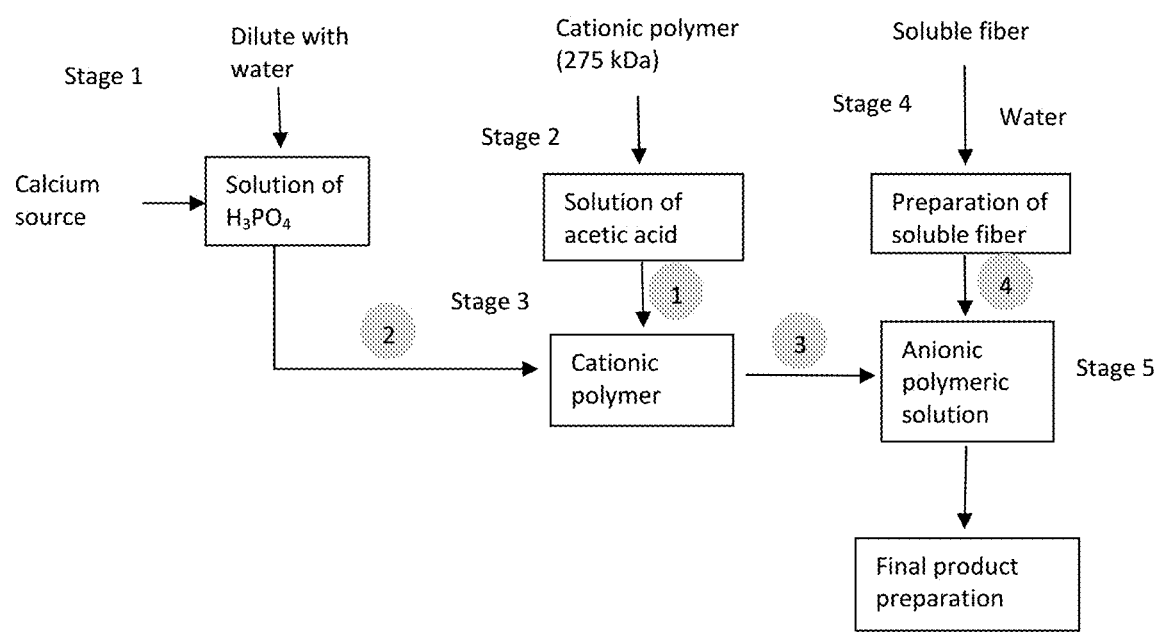
FIG. 8 shows the major steps for the preparation of soluble calcium, purpose of this invention.

Based on Example 6, mix 79 parts with 100 parts of Example 9. Add 50 parts of Example 8, subsection d). A fluid solution is obtained. The solution may be dried in the usual manner to produce a fine powder. The product contains calcium and soluble fiber. The product can be applied in liquid or solid form. The composition of the components, product of this invention is 3.75% tribasic calcium phosphate, 1.5% soluble calcium. 1.4% cationic polymer, 75.8% anionic polymer, 14.2 inulin and 4.7% fructans. The electromagnetic spectra shown in FIG. 4 and the electron micrograph, shown in FIG. 7 (2500×), show evidence of calcium stabilization at a ratio of 5.0 to the cationic polymer used.

Example 15

Based on Example 7, mix 79 parts with 100 parts of Example 9. Add 50 parts of Example 8, part e). A fluid solution is obtained. The solution may be dried in the usual manner to produce a fine powder. The product contains calcium and soluble fiber. The product can be applied in liquid or solid form. The composition of the components, product of this invention is 3.75% tribasic calcium phosphate, 1.5% soluble calcium. 1.4% cationic polymer, 75.8% anionic polymer, 18.9% inulin. The electromagnetic spectra shown in FIG. 4 and the electron micrograph, shown in FIG. 7 (2500×), show evidence of calcium stabilization at a ratio of 5.0 to the cationic polymer used.

The invention claimed is:

1. A method for a preparation of a stabilized soluble calcium complex including a) a source of calcium present in an amount of 0.05 mg to 15 mg per gram of a sample, b) a cationic polymer present in a mass ratio to the calcium source of between 0.25 and 12.5, c) an anionic hydrocolloid, and d) a source of a soluble fiber, the method comprising the steps of:
   a) preparing a first solution containing from 0.05 g to 5 g of a source of calcium, 1 mL of phosphoric acid, and 8 mL of water;
   b) preparing a second solution containing from 0.01 g to 4 g of a cationic polymer and 20 mL of 1% glacial acetic acid;
   c) producing a third solution by combining the solutions obtained in steps a) and b), maintaining the third solution at a temperature of between 1° C. to 70° C., and maintaining the mass proportions of the source of calcium and cationic polymer between 0.25 and 12.5;
   d) maintaining the pH of the solution of subsection c) at a pH of between 1.0 and 6.5, under conditions of rest for 1 to 24 hours, and under a controlled temperature of −5° C. to 20° C.;
   e) dispersing the solution of step d) in an anionic hydrocolloid selected from: arabic gum, guar gum, sodium or potassium alginate, propylene glycol alginate, mesquite gum, xanthan gum, locust bean gum, casein, or pectin;
   f) adding a source of soluble fiber selected from: agave fructans, inulin, or a mixture thereof;

g) conditioning the solution of step f) to be supplied in liquid form, reducing the volume of the solution by atomization in a spray dryer to a final concentration of total solids of from 30 g to 35 g per 100 ml of solution.

2. The method according to claim 1, wherein the source of calcium is selected from: tribasic calcium phosphate, calcium carbonate, calcium orthophosphate, or calcium oxide.

3. The method according to claim 1, wherein the cationic polymer is chitosan, potassium of animal or vegetable origin.

4. The method according to claim 1, wherein the anionic hydrocolloid is preferably selected from alginate, arabic gum or mixtures thereof, being present in an amount of from 0.01 g to 50 g with 0.25 g to 12 g of the calcium-chitosan complex.

5. The method according to claim 1, wherein the source of soluble fiber is added in the proportion of: 10 g of fructan, 10 g of inulin, 5 g of fructans and 5 g of inulin, 7.5 g fructans and 2.5 g of inulin, or 2.5 g fructans and 7.5 g inulin.

* * * * *